US008925320B1

(12) United States Patent
Kalina (10) Patent No.: US 8,925,320 B1
(45) Date of Patent: Jan. 6, 2015

(54) METHODS AND APPARATUS FOR OPTIMIZING THE PERFORMANCE OF ORGANIC RANKINE CYCLE POWER SYSTEMS (71) Applicant: Kalex, LLC, Belmont, CA (US)

(72) Inventor: Alexander I. Kalina, Hillsborough, CA (US)

(*) Notice: Subject to any disclaimer, the term of this patent is extended or adjusted under 35 U.S.C. 154(b) by 0 days.

(21) Appl. No.: 14/023,134

(22) Filed: Sep. 10, 2013

(51) Int. Cl.
*F01K 13/00* (2006.01)
*F01K 25/08* (2006.01)

(52) U.S. Cl.
CPC .............. *F01K 25/08* (2013.01); *F01K 13/006* (2013.01)
USPC ..................... 60/667; 60/651; 60/671; 60/664

(58) Field of Classification Search
CPC ....................................................... F01K 25/06
USPC ........... 60/643, 645, 649, 651, 660, 661, 664, 60/665, 667, 670, 671, 673
See application file for complete search history.

(56) References Cited

U.S. PATENT DOCUMENTS

| | | | | |
|---|---|---|---|---|
| 3,413,809 A | * | 12/1968 | Bredtschneider et al. | 60/667 |
| 3,636,706 A | * | 1/1972 | Minto | 60/651 |
| 3,686,867 A | * | 8/1972 | Hull | 60/667 |
| 3,894,391 A | * | 7/1975 | Heitmann et al. | 60/575 |
| 4,471,620 A | * | 9/1984 | Binstock et al. | 60/653 |
| 4,586,340 A | * | 5/1986 | Kalina | 60/673 |
| 5,440,882 A | * | 8/1995 | Kalina | 60/641.2 |
| 8,763,398 B1 | * | 7/2014 | Kalina | 60/649 |
| 2007/0068161 A1 | * | 3/2007 | Kalina | 60/651 |
| 2011/0024084 A1 | * | 2/2011 | Kalina | 165/104.21 |
| 2011/0067400 A1 | * | 3/2011 | Kalina | 60/651 |

* cited by examiner

*Primary Examiner* — Thomas Denion
*Assistant Examiner* — Laert Dounis
(74) *Attorney, Agent, or Firm* — Robert W. Strozier (57) ABSTRACT An optimized Rankine thermodynamic cycle system and method include utilizing a working fluid including a base component and an effective amount of a lower boiling point component, where the effective amount is sufficient to raise a power utilization efficiency of the systems by up to 10%, without changing a weight of the fluid reducing turbine efficiency for the particular base component and for optimizing output control valves for adjusting the working fluid composition and temperature sensors measuring an initial temperature of a coolant medium and a final temperature of a heat source stream to computer control valves to continuously adjust a pressure and a flow rate of a working fluid stream to be vaporized so that a heat utilization of the system is about 99% increasing output by approximately 3% to 6% on a sustained and permanent yearly basis.

12 Claims, 4 Drawing Sheets

METHODS AND APPARATUS FOR OPTIMIZING THE PERFORMANCE OF ORGANIC RANKINE CYCLE POWER SYSTEMS

BACKGROUND OF THE INVENTION

1. Field of the Invention

Embodiments of the present invention relate to optimize the performance of organic Rankine cycle (ORC) power systems that utilize a working fluid and a geothermal heat source or similar heat sources.

More specifically, embodiments of the present invention relate to optimize the performance of organic Rankine cycle power systems that utilize a working fluid and a geothermal heat source or similar heat sources, where the cycles are binary power systems of an organic Rankine cycles utilizing a flow of a geothermal fluid or a similar heat source fluid. The present power cycles provide three improvements, all of which are intended to work together. Current, ORC systems have several limitations, which the present invention is intended to improve, overcome or solve.

2. Description of the Related Art

One primary limitation of an ORC system is the fact that the geofluid commonly used as a heat source fluid is usually highly mineralized, which limits the minimum temperature to which this geofluid can be cooled to provide heat for a geothermal power system. If it is cooled further than this limit, the mineralization will be deposited on the heat exchange apparatus, fouling it and interfering with the operation of the power system.

However, ORC power systems in current operation do not make maximum allowable utilization of their heat sources. Because the temperature of the cooling medium (air or water) varies over the course of each day, as well as by season and in response to the weather, the working fluid enters and exits the system's feed pump with different temperatures, depending on the coolant temperature. Thus, in real-world operation, an ORC system must operate so that, even on the coldest day (corresponding to the coldest possible temperature of the cooling medium), the exit temperature of the heat source always remains above the limit imposed by issues of mineralization.

Another factor that must be considered is that, the higher the boiler pressure, the higher the boiling temperature becomes. This means that as the pressure in the boiler is increased, the portion of heat available for the process of vaporization becomes smaller. That is, all of the heat available from a given heat source may be conceptually divided into two portions; the heat used for the vaporization of the working fluid and the heat used for the pre-heating of the working fluid from the temperature at the point just after the feed pump up to the boiling temperature of the working fluid.

But at the same time, the higher the boiler pressure, the more power output the system yields per given weight unit (pound, kilogram, etc.,) of working fluid. Thus higher pressure in the boiler increases output per weight unit of working fluid but decreases the total amount of working fluid that may be vaporized by the heat source. The goal in actual operation is to attain a point which corresponds to maximum power output, rather than just maximum heat source utilization. For each given allowable condensation temperature, there will be an optimal desired pressure in the boiler at which the system output will be maximized; this may or may not correspond to maximum possible heat source utilization. In certain parameters, higher pressure in the boiler will allow for increased output per unit of heat source fluid, even if the outlet temperature of the heat source fluid is not at the lowest allowable point.

Yet another limitation on the operation of ORC plants is that, because the working fluid is a hydrocarbon (e.g., isopentane), it must not be allowed to form a potentially explosive, fuel-air mixture at any point in the system. This is a potential issue in the system's condenser, and due to this fact, the pressure in the condenser must always be maintained at a pressure above atmospheric pressure; the usual operational standard is to maintain a pressure in the condenser of 15.693 psia or 1 psig, i.e., 1 psi above atmospheric pressure.

At sea level, this pressure corresponds to a temperature of condensation for the isopentane working fluid of 85.53° F. When the temperature of the cooling air becomes substantially lower than this temperature, the temperature of condensation must still remain constant. To that end, the flow of cooling air is reduced so that the temperature of condensation remains at 85.53° F. or higher, and thus the corresponding pressure remains at 1 psig. Thus any potential increase in power output that would otherwise be available from such a decrease in the temperature of the cooling media cannot be utilized. There is some economy attained from reducing the work of the fans that bring in the cooling air, but this is relatively small; the system's gross output is unchanged but the reduced fan energy costs do slightly improve net output. None the less, most of the potential for increased output available from the cooler air is not utilized.

The need to keep the outlet temperature of the heat source above the point at which mineralization begins to occur, the need to keep the pressure in the condenser above its mandatory minimum, and the desire to establish an optimal pressure in the boiler to obtain optimal power output for the system are all subject to a limitation inherent in a conventional ORC system.

In order to attain the optimum set of parameters of a power system, it is necessary to vary the boiling pressure and the flow rate of the working fluid, based on the coolant temperature, while carefully keeping both heat source outlet temperature and condenser pressure above their required minimums. However, the work done by the feed pump in a conventional ORC system is such that, for any given difference of pressure between the points before and after the feed pump, there is one specific and invariable flow rate of working fluid through the system.

At the same time, the flow rate that would be required for the optimal operation of the power system at a given pressure is not the same as the flow rate inevitably corresponding to that given pressure. Because a conventional ORC system has no capability to vary its flow rate independent of its pressure, a conventional ORC system operates in a suboptimal regime, i.e., chosen to maximize output as best as possible, while carefully staying within the limits imposed by the mineralization-based minimal allowable heat-source outlet temperature and minimal allowable condenser pressure.

One more additional issue with the conventional ORC technology is that, in order to regulate the flow rate through the turbine, i.e., a required capability, as the turbine has a maximum flow rate that it can accept and this must not be exceeded, an admission valve is installed prior to the turbine. The admission valve allows the flow rate through the turbine to be controlled, preventing the turbine from excess flow rate, but such use of an admission valve results in a pressure loss and corresponding loss of possible output.

Thus, there is a need in the art for systems and methods for implementing the systems that address these output limitations of conventional ORC power system.

SUMMARY OF THE INVENTION

Embodiments of the present invention provide methods for optimizing the operation of geothermal organic Rankine cycle (ORC) power systems so that the utilization of the heat source is increased. The methods include adding an effective amount of a lower boiling point component to a single component working fluid, where the effective amount is sufficient to raise a power utilization efficiency of the methods by up to 10%, without substantially changing a weight of the working fluid, which would reduce turbine efficiency. In certain embodiments, the effective amount of the lower boiling point component is adjusted to maximize power output or heat utilization. In other embodiments, the effective amount of the lower boiling point component added to the single component working fluid is sufficient to maximize power output of the methods based on the base component and the lower boiling point component. In other embodiments, the effective amount of the lower boiling point component added to the single component working fluid is less than or equal to about 5 wt. %. In other embodiments, the effective amount of the lower boiling point component added to the single component working fluid is between about 1 wt. % and about 5 wt. %. In certain embodiments, the effective amount of the lower boiling point component added to the single component working fluid is less than or equal to about 5 wt. %. In certain embodiments, the effective amount of the lower boiling point component added to the single component working fluid is between about 1 wt. % and about 5 wt. %. In other embodiments, the effective amount of the lower boiling point component added to the single component working fluid is between about 2 wt. % and about 4 wt. %. In other embodiments, the effective amount of the lower boiling point component added to the single component working fluid is between about 2 wt. % and about 3 wt. %.

Embodiments of the present invention provide systems for optimizing the operation of geothermal organic Rankine cycle (ORC) power systems so that the utilization of the heat source is increased, where the systems include a working fluid including a base component and an effective amount of a lower boiling point component, where the effective amount is sufficient to raise a power utilization efficiency of the systems by up to 10%, without changing a weight of the fluid reducing turbine efficiency for the particular base component. In certain embodiments, the system include a source of the base component and a source of the lower boiling point components and flow control units so that the effective amount of the base component and the lower boiling point component may be adjusted to maximize power output or heat utilization. In other embodiments, the effective amount of the lower boiling point component added to the single component working fluid is sufficient to maximize power output of the methods based on the base component and the lower boiling point component. In other embodiments, the effective amount of the lower boiling point component added to the single component working fluid is less than or equal to about 5 wt. %. In other embodiments, the effective amount of the lower boiling point component added to the single component working fluid is between about 1 wt. % and about 5 wt. %. In certain embodiments, the effective amount of the lower boiling point component added to the single component working fluid is less than or equal to about 5 wt. %. In certain embodiments, the effective amount of the lower boiling point component added to the single component working fluid is between about 1 wt. % and about 5 wt. %. In other embodiments, the effective amount of the lower boiling point component added to the single component working fluid is between about 2 wt. % and about 4 wt. %. In other embodiments, the effective amount of the lower boiling point component added to the single component working fluid is between about 2 wt. % and about 3 wt. %.

Embodiments of the present invention provide methods for optimizing the operation of geothermal power systems so that the utilization of the heat source is maximized at all possible coolant temperatures. In certain embodiments, the methods based on binary power systems or so called organic Rankine cycles (ORCs). In certain embodiments, the effective amount of the lower boiling point component is adjusted to maximize power output or heat utilization. In other embodiments, the effective amount of the lower boiling point component added to the single component working fluid is sufficient to maximize power output of the methods based on the base component and the lower boiling point component. In other embodiments, the effective amount of the lower boiling point component added to the single component working fluid is less than or equal to about 5 wt. %. In other embodiments, the effective amount of the lower boiling point component added to the single component working fluid is between about 1 wt. % and about 5 wt. %. In certain embodiments, the effective amount of the lower boiling point component added to the single component working fluid is less than or equal to about 5 wt. %. In certain embodiments, the effective amount of the lower boiling point component added to the single component working fluid is between about 1 wt. % and about 5 wt. %. In other embodiments, the effective amount of the lower boiling point component added to the single component working fluid is between about 2 wt. % and about 4 wt. %. In other embodiments, the effective amount of the lower boiling point component added to the single component working fluid is between about 2 wt. % and about 3 wt. %.

Embodiments of the present invention provide apparatuses for optimizing the operation of geothermal power systems so that the utilization of the heat source is maximized at all possible coolant temperatures. In certain embodiments, the apparatuses are binary power systems or so call organic Rankine cycles (ORCs). In certain embodiments, the system include a source of the base component and a source of the lower boiling point components and flow control units so that the effective amount of the base component and the lower boiling point component may be adjusted to maximize power output or heat utilization. In other embodiments, the effective amount of the lower boiling point component added to the single component working fluid is sufficient to maximize power output of the methods based on the base component and the lower boiling point component. In other embodiments, the effective amount of the lower boiling point component added to the single component working fluid is less than or equal to about 5 wt. %. In other embodiments, the effective amount of the lower boiling point component added to the single component working fluid is between about 1 wt. % and about 5 wt. %. In certain embodiments, the effective amount of the lower boiling point component added to the single component working fluid is less than or equal to about 5 wt. %. In certain embodiments, the effective amount of the lower boiling point component added to the single component working fluid is between about 1 wt. % and about 5 wt. %. In other embodiments, the effective amount of the lower boiling point component added to the single component working fluid is between about 2 wt. % and about 4 wt. %. In other embodiments, the effective amount of the lower boiling point component added to the single component working fluid is between about 2 wt. % and about 3 wt. %.

Embodiments of the present invention provide methods for removing oil build up in the working fluid by running the working fluid through system, while bypassing the turbine subsystem and capturing the condensed working fluid in a reserve tank, until a small amount of highly oil contaminated working fluid remains in the system. At this point, the remaining working fluid is removed, removing the oil. The working fluid in the reserve tank is reintroduced into the system and a small amount of additional working fluid is added to compensate for the quantity of oil contaminated working fluid removed and the cycle is re-initialized. These steps are repeated as needed or on a periodic bases to reduce oil contamination without having to replace the working fluid and with minimal disruption in power generation.

BRIEF DESCRIPTION OF THE DRAWINGS

The invention can be better understood with reference to the following detailed description together with the appended illustrative drawings in which like elements are numbered the same.

DEFINITIONS USED IN THE INVENTION

The term "substantially" means that the value of the value or property that the term modifies is within about 10% of the related value or property. In other embodiments, the term means that the value or property is within 5% of the related value or property. In other embodiments, the term means that the value or property is within 2.5% of the related value or property. In other embodiments, the term means that the value or property is within 1% of the related value or property. For example, the term "substantially" used in the reduction in the unit weight of the working fluid due to the addition of the lower boiling component mean that the weight does not reduce or only minimally reduces turbine efficiency. Stated differently, the term significantly changing the weight of the working fluid means that the weight of the working fluid is reduced by no more than 5%. In other embodiments, the significantly changing the weight of the working fluid means that the weight of the working fluid is reduced by no more than 2.5%. In other embodiments, the significantly changing the weight of the working fluid means that the weight of the working fluid is reduced by no more than 1%.

DETAILED DESCRIPTION OF THE INVENTION

The inventor has found that an optimized thermodynamic cycle, in particular, an optimized organic Rankine cycle (ORC) may be implemented, where the methods and apparatuses establishing the cycle continuously monitor and adjust a boiling pressure and a flow rate of the working fluid entering the vaporization subsystem based on a final temperature of a heat source stream and a temperature of a condensed working fluid corresponding to an initial temperature of a coolant used to condense the working fluid. In order to attain this optimum set of parameters for the power systems of this invention, it is necessary to vary the boiling pressure and the flow rate of the working fluid, based on the coolant temperature. However, the work done by the feed pump is such that, for any given difference in pressure between the stream at a location before and after the feed pump, there is one specific and invariable flow rate of the working fluid through the system. At the same time, the flow rate required for the optimal operation of the power systems of this invention at a given pressure is not the same as the actual flow rate that that given pressure inevitably corresponds to. Thus, in order to achieve the optimal operation of the power systems of this invention, it is necessary to have the capability to change the pressure and flow rate separately and independent of each other.

An embodiment of a system of this invention for implement a thermodynamic cycle including a condenser subsystem comprising at least one first heat exchange unit that condenses a spent working fluid stream to form a condensed working fluid stream. The system also includes a vaporization or boiling subsystem comprising at least one heat exchange unit that vaporizes the flow rate and pressure adjusted vaporization subsystem input stream to form a vaporized energy conversion subsystem input stream, and an energy conversion subsystem comprising at least one turbine that extracts a portion of thermal energy from the vaporized energy conversion subsystem input stream to form the spent working fluid stream. The working fluid used the system comprises a base component and an effective amount of a lower boiling point component, where the effective amount is sufficient to increase a power utilization efficiency of the system, without changing a weight of the fluid reducing turbine efficiency for the particular base component. The system may further include a working fluid pressure and flow control subsystem comprising at least a feed pump, a control valve, a bypass valve, a first temperature sensor, a second temperature sensor, a dividing valve, and mixing valve, where the processing unit adjusts a flow rate and a pressure of a vaporization subsystem input stream from the condensed working fluid stream, where the control valve and the bypass valve are flow control valves and are controlled by the processing unit controlled in such a way as to optimize the pressure and flow rate of the flow rate and pressure adjusted vaporization subsystem input stream optimizing a power output of the system based on a condensation temperature of the condensed working fluid stream and a final heat source temperature increasing system output between about 3% and 6% on a yearly basis. In certain embodiments, the mixing valve combines the condensed working fluid stream and a pressure adjusted recirculation stream exiting the bypass valve to form a feed pump input stream, the feed pump pumps the feed pump input stream to a higher pressure to form a pressurized stream, the dividing valve divides the pressurized stream into a control valve input stream and a recirculation stream, the control valve adjusts a pressure and a flow rate of the control valve output stream to form the flow rate and pressure adjusted vaporization subsystem input stream, and the bypass valve adjusts a pressure and a flow rate of the recirculation stream to form the pressure adjusted recirculation stream. In other embodiments, the mixing valve combines the condensed working fluid stream and a pressure adjusted recirculation stream exiting the bypass valve to form a feed pump input stream, the feed pump pumps the feed pump input stream to a higher pressure to form a pressurized control valve input stream, the control valve adjusts a pressure and a flow rate of the pressurized control valve input stream to form a pressure adjusted stream, the dividing valve divides the pressurized adjusted stream into the flow rate and pressure adjusted vaporization subsystem input stream and a recirculation stream, and the bypass valve adjusts a pressure and a flow rate of the recirculation stream to form the pressure adjusted recirculation stream. In certain embodiments, the base component is selected from the group consisting of a hydrocarbon and a freon, and the lower boiling point component is selected from the groups consisting a hydrocarbon or a freon, having a boiling point lower than the boiling point of the base component. In other embodiments, the base component is isopentane and the lower boiling point component comprises propane.

An embodiment of a method for implement a thermodynamic cycle comprising the steps of condensing a spent working fluid stream in counterflow with a coolant stream in a condenser subsystem comprising at least one first heat exchange unit to form a condensed working fluid stream. The method also includes the step of vaporizing the vaporization subsystem input stream in a vaporization or boiling subsystem comprising at least one heat exchange unit to form a vaporized energy conversion subsystem input stream. The method also includes the step of converting a portion of the thermal energy in the vaporized energy conversion subsystem input stream in an energy conversion subsystem comprising at least one turbine to form the spent working fluid stream. In the method, the working fluid including a base component and an effective amount of a lower boiling point component, where the effective amount is sufficient to raise a power utilization efficiency of the systems by up to 10%, without changing a weight of the fluid reducing turbine efficiency for the particular base component. In other embodiments, the method further comprising the step of prior to the vaporizing step, producing a vaporization subsystem input stream in a working fluid pressure and flow control subsystem comprising at least a feed pump, a control valve, a bypass valve, a first temperature sensor, a second temperature sensor, a processing unit, a dividing valve, mixing valve and a processing unit from the condensed working fluid stream, where the control valve and the bypass valve are flow control valves and are controlled by the processing unit controlled in such a way as to optimize the pressure and flow rate of the flow rate and pressure adjusted vaporization subsystem input stream optimizing a power output of the system based on an initial coolant temperature and a final heat source temperature and where the system increases system output between about 3% and 6% on a yearly basis. In certain embodiments, the method further including the steps of combining the condensed working fluid stream and a pressure adjusted recirculation stream exiting the bypass valve in the mixing valve to form a feed pump input stream, pumping the feed pump input stream to a higher pressure in the feed pump to form a pressurized stream, dividing the pressurized stream into a control valve input stream and a recirculation stream in the dividing valve, adjusting a pressure and a flow rate of the control valve input stream in the control valve to form the vaporization subsystem input stream, and adjusting a pressure and a flow rate of the recirculation stream in the bypass valve to form the pressure adjusted recirculation stream. In other embodiments, the method further including the steps of mixing the condensed working fluid stream and a pressure adjusted recirculation stream exiting the bypass valve in the mixing valve to form a feed pump input stream, pumping the feed pump input stream to a higher pressure in the feed pump to form a pressurized control valve input stream, adjusting a pressure and a flow rate of the pressurized control valve input stream in the control valve to form a pressure adjusted stream, dividing the pressure adjusted stream in the dividing valve into the vaporization subsystem input stream and a recirculation stream, and adjusting a pressure and a flow rate of the recirculation stream in the bypass valve to form the pressure adjusted recirculation stream. In other embodiments, the base component is selected from the group consisting of a hydrocarbon and a freon, and the lower boiling point component is selected from the groups consisting a hydrocarbon or a freon, having a boiling point lower than the boiling point of the base component. In other embodiments, the base component is isopentane and the lower boiling point component is propane.

An embodiment of a system for implement a thermodynamic cycle including a condenser subsystem comprising at least one first heat exchange unit that condenses a spent working fluid stream to form a condensed working fluid stream. The system also includes a working fluid pressure and flow control subsystem comprising at least a feed pump, a control valve, a bypass valve, a first temperature sensor, a second temperature sensor, a dividing valve, and mixing valve, where the processing unit adjusts a flow rate and a pressure of a vaporization subsystem input stream from the condensed working fluid stream and a vaporization or boiling subsystem comprising at least one heat exchange unit that vaporizes the flow rate and pressure adjusted vaporization subsystem input stream to form a vaporized energy conversion subsystem input stream. The system also includes an energy conversion subsystem comprising at least one turbine that extracts a portion of thermal energy from the vaporized energy conversion subsystem input stream to form the spent working fluid stream. The control valve and the bypass valve are flow control valves and are controlled by the processing unit controlled in such a way as to optimize the pressure and flow rate of the flow rate and pressure adjusted vaporization subsystem input stream optimizing a power output of the system based on a condensation temperature of the condensed working fluid stream and a final heat source temperature increasing system output between about 3% and 6% on a yearly basis. In certain embodiments, the mixing valve combines the condensed working fluid stream and a pressure adjusted recirculation stream exiting the bypass valve to form a feed pump input stream, the feed pump pumps the feed pump input stream to a higher pressure to form a pressurized stream, the dividing valve divides the pressurized stream into a control valve input stream and a recirculation stream, the control valve adjusts a pressure and a flow rate of the control valve output stream to form the flow rate and pressure adjusted vaporization subsystem input stream, and the bypass valve adjusts a pressure and a flow rate of the recirculation stream to form the pressure adjusted recirculation stream. In certain embodiments, the mixing valve combines the condensed working fluid stream and a pressure adjusted recirculation stream exiting the bypass valve to form a feed pump input stream, the feed pump pumps the feed pump input stream to a higher pressure to form a pressurized control valve input stream, the control valve adjusts a pressure and a flow rate of the pressurized control valve input stream to form a pressure adjusted stream, the dividing valve divides the pressurized adjusted stream into the flow rate and pressure adjusted vaporization subsystem input stream and a recirculation stream, and the bypass valve adjusts a pressure and a flow rate of the recirculation stream to form the pressure adjusted recirculation stream. In certain embodiments, the working fluid comprises a base component and an effective amount of a lower boiling point component, where the effective amount is sufficient to increase a power utilization efficiency of the system, without changing a weight of the fluid reducing turbine efficiency for the particular base component, where the base component is selected from the group consisting of a hydrocarbon and a freon, and a lower boiling point component is selected from the groups consisting a hydrocarbon or a freon, having a boiling point lower than the boiling point of the base component. In other embodiments, the base component is isopentane and the lower boiling point component comprises propane.

An embodiment of a method for implement a thermodynamic cycle comprising the steps of condensing a spent working fluid stream in counterflow with a coolant stream in a condenser subsystem comprising at least one first heat exchange unit to form a condensed working fluid stream. The method also includes producing a vaporization subsystem input stream in a working fluid pressure and flow control subsystem comprising at least a feed pump, a control valve, a bypass valve, a first temperature sensor, a second temperature sensor, a processing unit, a dividing valve, mixing valve and a processing unit from the condensed working fluid stream, and vaporizing the vaporization subsystem input stream in a vaporization or boiling subsystem comprising at least one heat exchange unit to form a vaporized energy conversion subsystem input stream. The method also includes converting a portion of the thermal energy in the vaporized energy conversion subsystem input stream in an energy conversion subsystem comprising at least one turbine to form the spent working fluid stream. The control valve and the bypass valve are flow control valves and are controlled by the processing unit controlled in such a way as to optimize the pressure and flow rate of the flow rate and pressure adjusted vaporization subsystem input stream optimizing a power output of the system based on an initial coolant temperature and a final heat source temperature and where the system increases system output between about 3% and 6% on a yearly basis. In certain embodiments, the method further includes the steps of combining the condensed working fluid stream and a pressure adjusted recirculation stream exiting the bypass valve in the mixing valve to form a feed pump input stream, pumping the feed pump input stream to a higher pressure in the feed pump to form a pressurized stream, dividing the pressurized stream into a control valve input stream and a recirculation stream in the dividing valve, adjusting a pressure and a flow rate of the control valve input stream in the control valve to form the vaporization subsystem input stream, and adjusting a pressure and a flow rate of the recirculation stream in the bypass valve to form the pressure adjusted recirculation stream. In other embodiments, the method further includes the steps of mixing the condensed working fluid stream and a pressure adjusted recirculation stream exiting the bypass valve in the mixing valve to form a feed pump input stream, pumping the feed pump input stream to a higher pressure in the feed pump to form a pressurized control valve input stream, adjusting a pressure and a flow rate of the pressurized control valve input stream in the control valve to form a pressure adjusted stream, dividing the pressure adjusted stream in the dividing valve into the vaporization subsystem input stream and a recirculation stream, and adjusting a pressure and a flow rate of the recirculation stream in the bypass valve to form the pressure adjusted recirculation stream. In certain embodiments, the working fluid comprises a base component and an effective amount of a lower boiling point component, where the effective amount is sufficient to increase a power utilization efficiency of the system, without changing a weight of the fluid reducing turbine efficiency for the particular base component, where the base component is selected from the group consisting of a hydrocarbon and a freon, and a lower boiling point component is selected from the groups consisting a hydrocarbon or a freon, having a boiling point lower than the boiling point of the base component. In other embodiments, the base component is isopentane and the lower boiling point component is propane.

An embodiment of a method for removing oil contamination from an organic Rankine cycle system comprising a condenser subsystem comprising at least one first heat exchange unit that condenses a spent working fluid stream to form a condensed working fluid stream, a pressure and flow rate adjusting subsystem comprising a feed pump, a vaporization or boiling subsystem comprising at least one heat exchange unit that vaporizes the pressurized condensed working fluid stream to form a vaporized working fluid stream, an energy conversion subsystem comprising at least one turbine, an admission valve, and a turbine bypass valve that extracts a portion of thermal energy from the vaporized working fluid stream to form the spent working fluid stream, and a working fluid reserve tank subsystem including a reserve tank, a first valve for stopping a flow of working fluid to the vaporization subsystem, a second valve for stopping a flow of working fluid to the reserve tank, and a third valve for directing working fluid from the reserve tank back into the system. The method includes the steps of concurrently, stopping the feed pump, closing the admission valve and the first valve to stop the flow of working fluid through the system, and opening the second valve and the turbine bypass valve to direct cleaned working fluid into the reserve tank. The method also includes the steps of continuing a flow of a heat source stream into the vaporization or boiling subsystem and a flow of a cooling stream into the condensation subsystem so that residual working fluid contaminated with a turbine lubricating oil boils in the vaporization or boiling subsystem to form a highly contaminated working fluid and a cleaned vaporized working fluid, which is condensed in the condensation subsystem to form a cleaned condensed working fluid, which is collected in the reserve tank, and removing the highly contaminated working fluid from the vaporization or boiling subsystem, adding an amount of working fluid to the reserve tank to account for the removed highly contaminated working fluid. The method also includes the steps of concurrently, opening the third valve, closing the second valve, and charging the working fluid from the reserve tank into the system, concurrently closing the third valve, starting the feed pump, opening the admission valve and the first valve, and closing the turbine bypass valve restarting the system of clean or substantially cleaned working fluid, and periodically repeating the steps on a period basis. In certain embodiments, the period basis occurs when a degree of oil contamination of the working fluid reaches as given level, where the given level causes a given decrease in system performance. In other embodiments the period basis is yearly.

SUITABLE REAGENTS AND EQUIPMENT

The working fluids used in the systems of this invention include a base component and an effective amount of a lower boiling point component. The base component comprises a hydrocarbon or a freon. The lower boiling point component comprises a hydrocarbon or a freon, having a boiling point lower than the boiling point of the base component. Exemplary examples of the base component and lower boiling point component include, without limitation, propane, n-butane, n-pentane, n-hexane, n-heptane, n-octane, isobutane, isopentane, isoheptane, isooctane, or higher n-alkanes or higher n-isoalkanes, where the base component has a higher boiling point than the lower boiling point component. Thus, for a Rankine cycle system using isopentane as the base component, the lower boiling point component may be propane, iso-butane, or n-butane.

It should be recognized by an ordinary artisan that at those points in the systems of this invention were a stream is split into two or more sub-streams, dividing valves that affect such stream splitting are well known in the art and may be manually adjustable or dynamically adjustable so that the splitting achieves the desired stream flow rates and system efficiencies. Similarly, when stream are combined, combining valve that affect combining are also well known in the art and may be manually adjustable or dynamically adjustable so that the splitting achieves the desired stream flow rates and system efficiencies.

SPECIFIC EMBODIMENTS

Generalized Improved Rankine or Organic Rankine Cycles

First Generalized Embodiment

Figure 1:
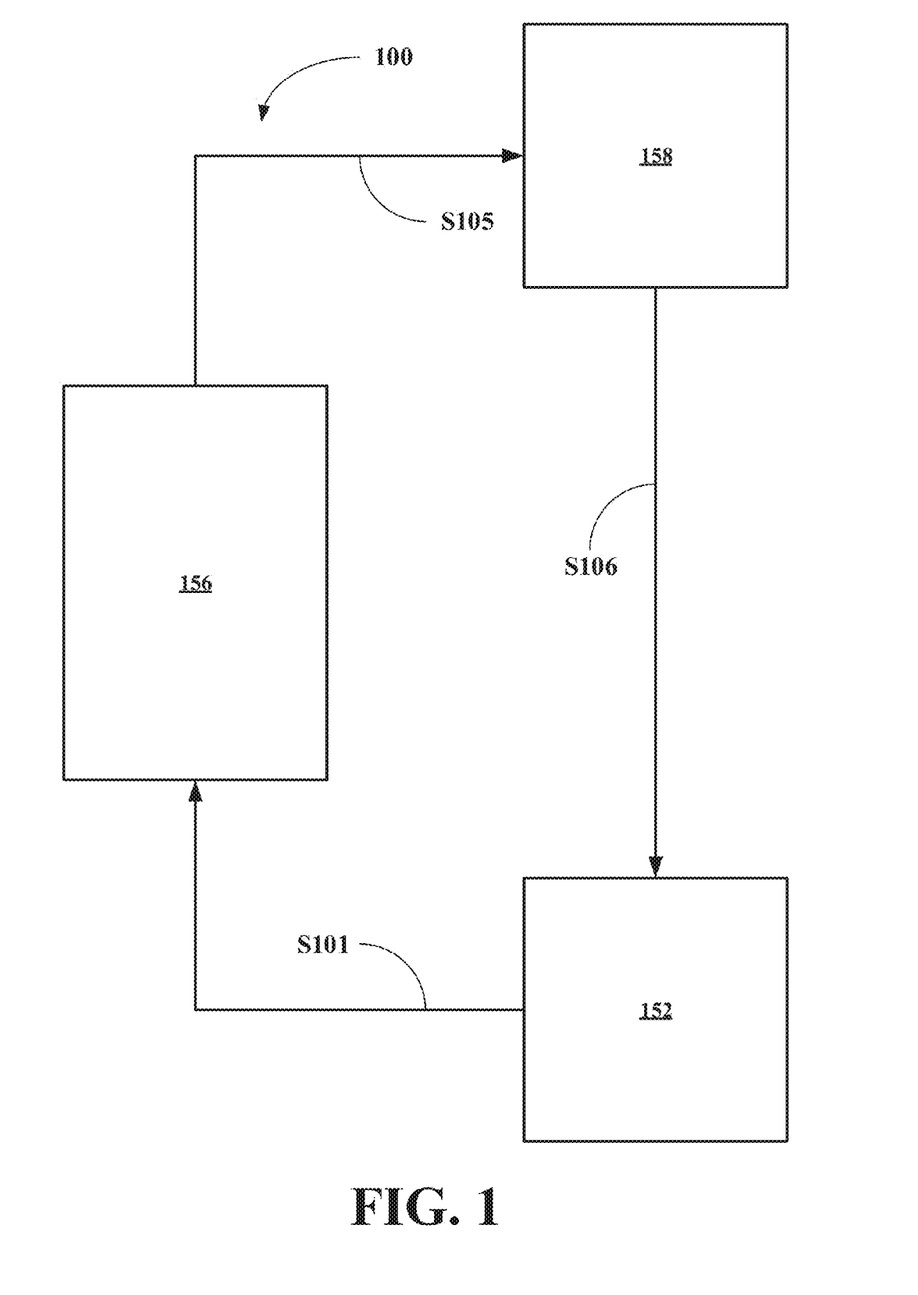
FIG. 1 depicts an embodiment of an improved Rankine power generation system using geofluids and a working fluid including a base component and an effective amount of a lower boiling point component.

Referring now to FIG. 1, an embodiment of this invention, generally 100, is shown to include: (a) a condenser subsystem 152 comprising at least one first heat exchange unit and at least one feed pump, (b) a vaporization or boiling subsystem 156 comprising at least one heat exchange unit, and (c) an energy conversion subsystem 158 comprising at least one turbine. It should be noted that the systems of this invention utilize a working fluid stream and all the streams in the systems have the same working fluid composition. Therefore, the term "stream" refers to a working fluid stream and is to be understood in that manner throughout the descriptions set forth below. As stated above, the working fluid includes the base component and an effective amount of the lower boiling point component, where the effective amount is sufficient to maximize the power output of the system 100, while maintaining substantially the same unit weight of the working fluid.

The condensation subsystem 152 condenses and pressurizes a spent working fluid stream S106 to form a higher pressure condensed working fluid stream S101. The higher pressure condensed stream S101 is then forwarded to the vaporization and boiler subsystem 156, where the higher pressure condensed stream S101 is vaporized or fully vaporized or fully vaporized and superheated to form a higher pressure vaporized stream or a fully vaporized stream or a fully vaporized and superheated stream S105. The stream S105 is then forwarded to the energy conversion subsystem 158, where a portion of its thermal energy is converted to mechanical and/or electrical energy, a usable form of energy to produce a spent stream 8106.

In this embodiments, for an isopentane ORC system the lower boiling component, ideally propane, is added to the isopentane working fluid, so that the final working fluid includes an effective amount of propane, where the effective amount is 3.5% propane in the isopentane working fluid. In certain embodiments, the effective amount is 3.0% propane in the isopentane working fluid. In certain embodiments, the effective amount is 2.5% propane in the isopentane working fluid. This change in the working fluid composition has several beneficial effects.

The change in working fluid composition reduces a minimum allowable temperature of condensation, which corresponds to a minimum allowable safe condensation pressure of 1 psig, from 85.53° F. to 65.58° F. A pressure of condensation will remain the same, but the minimum allowable temperature of condensation will be much lower. This dramatically increases the thermodynamic reversibility of the process and allows the use of cooler air to increase the total output of the system.

The change of working fluid composition also lowers an initial boiling point temperature of the working fluid, increasing the available heat for vaporization and allows better utilization of the heat source stream. Likewise, because the modified working fluid enters the vaporization subsystem with a lower temperature, it is possible, in some circumstances, to cool the heat source closer to its safe (mineralization-based) minimum outlet temperature and thus utilize even more heat from the heat source. Both of these factors may allow for the delivery of more power output.

The change in working fluid composition also makes the working fluid a mixture, which means that it now boils and condenses at variable temperatures providing a better "match" between the heat source and the working fluid, as well as a better match between the working fluid and the coolant and reducing temperature differences in both the vaporization subsystem and in the condenser, which in turn further reduces energy losses (in the vaporization and condensation subsystems), yet further increasing the system power output.

Second Generalized Embodiment

Figure 2:
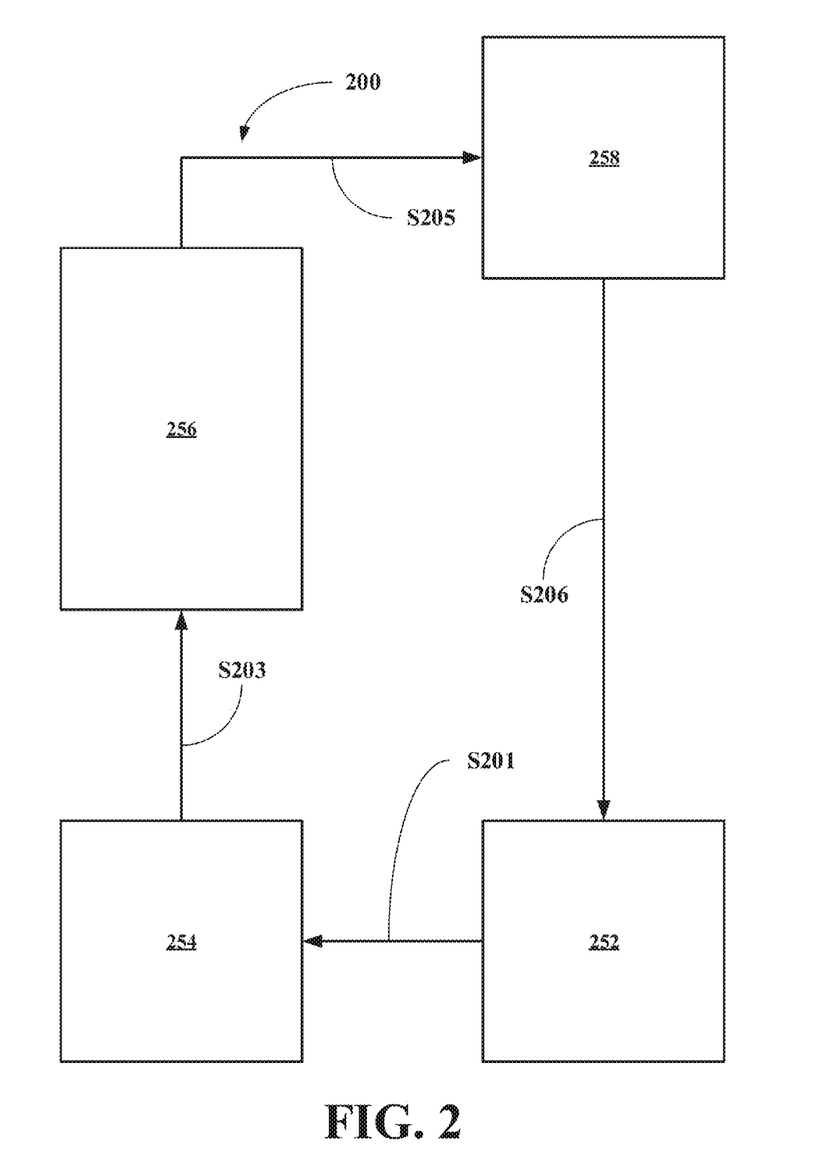
FIG. 2 depicts another embodiment of an improved Rankine power generation system using geofluids including a computer tuned recycle loop and a working fluid including a base component and an effective amount of a lower boiling point component.

Referring now to FIG. 2, an embodiment of this invention, generally 200, is shown to include: (a) a condenser subsystem 252 comprising at least one first heat exchange unit and at least one pump, (b) a pressure and flow rate control subsystem 254 comprising a feed pump, valves, temperature sensors and a processing unit, (c) a vaporization or boiling subsystem 256 comprising at least one heat exchange unit, and (d) an energy conversion subsystem 258 comprising at least one turbine. It should be noted that the systems of this invention utilize a working fluid stream and all the streams in the systems have the same working fluid composition. Therefore, the term "stream" refers to a working fluid stream and is to be understood in that manner throughout the descriptions set forth below. In a variant of this system, the working fluid includes a base component and an effective amount of the lower boiling point component, where the effective amount is sufficient to maximize the power output of the system 200, while maintaining substantially the same unit weight of the working fluid.

The condensation subsystem 252 condenses a spent working fluid stream S206 to form a condensed working fluid stream S201. The condensed stream S201 is then forwarded to the pressure and flow rate control subsystem 254, where the subsystem 254 diverts or bypasses an amount of the condensed working fluid stream to form a pressure and flow rate adjusted working fluid stream S203 by pressurizing and pressure adjusting the stream. The pressure and flow rate adjusted working fluid stream S203 is then forwarded to the vaporization and boiler subsystem 256, where the stream S203 is vaporized or fully vaporized or fully vaporized and superheated to form a pressure and flow rate adjusted vaporized or fully vaporized or fully vaporized and superheated stream S205. The stream S205 is then forwarded to the energy conversion subsystem 258, where a portion of its thermal energy is converted to mechanical and/or electrical energy, a usable form of energy to produce a spent working fluid stream S206.

Specific Improved Rankine or Organic Rankine Cycles

First Specific Embodiment

Figure 3A:
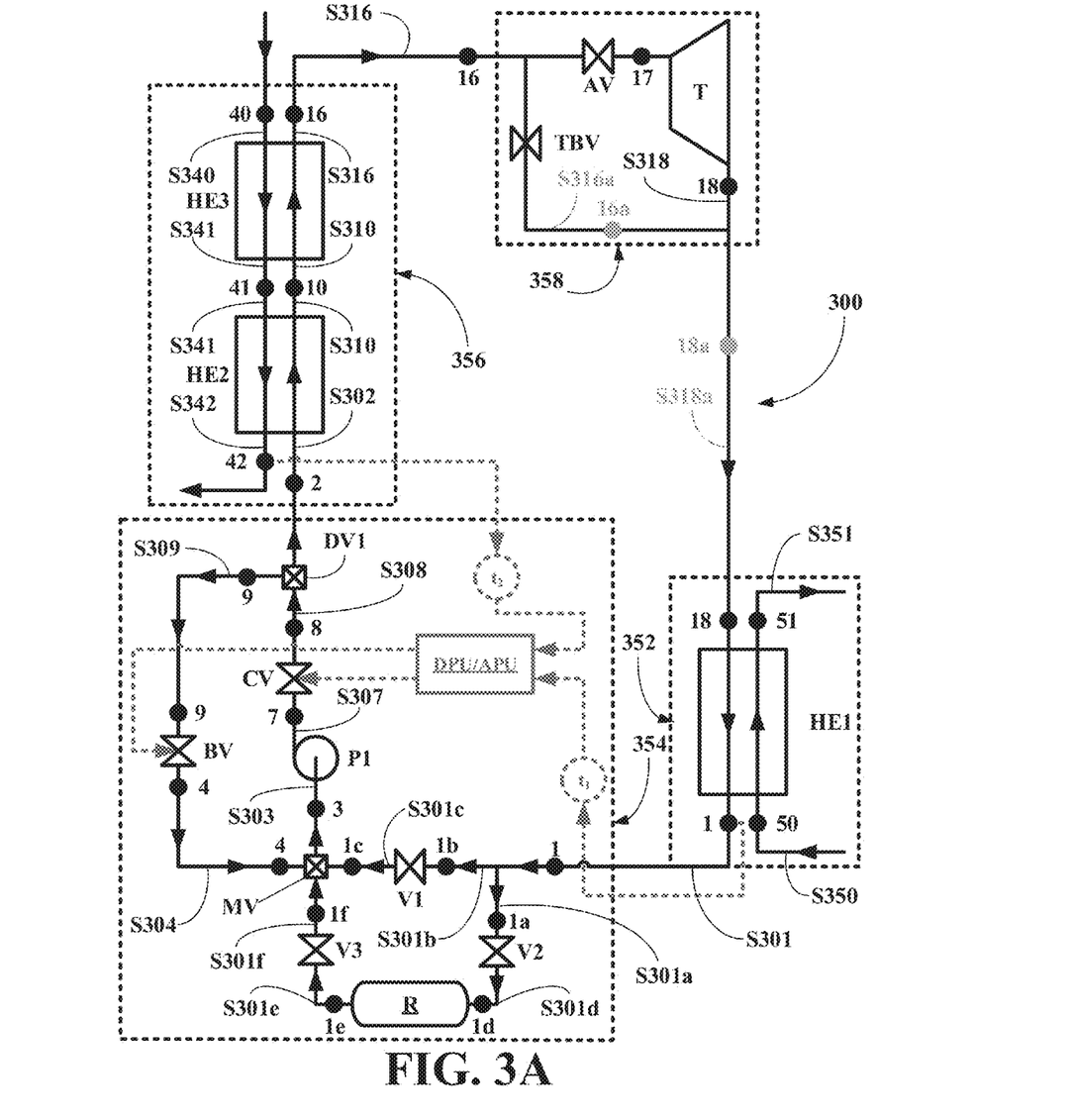
FIG. 3A depicts an embodiment of an optimized power generation system using geofluids.

Referring now to FIG. 3A, an embodiment of an improved ORC power system of this invention, generally 300, is shown to include: (a) a condenser subsystem 352 comprising a first heat exchange unit or condenser HE1, (b) a pressure and flow control subsystem 354 comprising a feed pump P1, a control valve CV, a bypass valve BV, a first temperature sensor $t_1$, a second temperature sensor $t_2$, a digital or analog processing unit (DPU/APU), a dividing valve DV, a mixing valve MV, and optionally a first flow diversion valve V1, a second flow diversion valve V2, a third flow diversion valve V3, and a reserve tank R, (c) a vaporization or boiling subsystem 356 comprising a second heat exchange unit HE2 and a third heat exchange unit HE3, and (d) an energy conversion subsystem 358 comprising an addition valve AV, a turbine T, and optionally a turbine by-pass valve TBV. Both the control valve CV and the bypass valve BV are flow control valves controlled by the DPU/APU in such a way as to optimize the power output of the system 300 at all coolant temperatures and all heat source temperatures. The feed pump P1 has a capacity that is maximized for a maximum possible flow rate for any given pressure, where the pressure is greater than what is required to attain optimal operation of the power system 300. It should be noted that the systems of this invention utilize a working fluid stream and all the streams in the systems have the same working fluid composition. Therefore, the term "stream" refers to a working fluid stream and is to be understood in that manner throughout the descriptions set forth below. In certain embodiments, the working fluid includes a base component and an effective amount of the lower boiling point component, where the effective amount is sufficient to maximize the power output of the system 300, while maintaining substantially the same unit weight of the working fluid.

The system 300 operates as follows: a condensed stream S301 having parameters as at a point 1 exits the first heat exchange unit or condenser HE1. The condensed stream S301 is combined by the mixing valve MV with a pressure adjusted recirculation stream S304 having parameters as at a point 4 forming a feed pump input stream S303 having parameters at as a point 3. A pressure of the feed pump input stream S303 is the same as a pressure of the condensed stream S301 having the parameters as the point 1. It should be recognized that the parameters of all streams comprise all characteristics and properties of each stream including at least pressure, temperature, composition, and flow rate.

The feed pump input stream S303 is then pumped to a higher pressure in the feed pump P1 to form a pressurized feed pump output stream S307 having parameters as at a point 7. The pressurized feed pump output stream S307 is then forwarded to the control valve CV, where a pressure of the pressurized feed pump output stream S307 is reduced to a desired pressure forming a pressure adjusted stream S308 having parameters as a point 8. The desired pressure of the stream S308 is an optimal pressure for the specific boundary conditions at which the power system 300 operates at any given moment and is set by the DPU/APU, which controls the control valve CV as explained more fully below.

If the entire flow of the stream S308 exiting the control valve CV, then a flow rate of the stream entering the vaporization or boiling subsystem 356 would be higher than needed for optimal performance. Thus, the stream S308 is divided by the dividing valve DV1 into two substreams: a flow rate adjusted stream S302 having parameters as at a point 2 and a diverted or recirculation stream S309 having parameters as at a point 9.

The stream S309 is then sent through a bypass valve BV, where its pressure is reduced to a pressure equal to a pressure of the working fluid stream S301 having the parameters as at the point 1 forming the stream S304 having parameters as at the point 4. The stream S304 is then combined by the mixing valve MV with the stream S301, thereby recirculating the excess working fluid flow through the pump P1 in the form of the combined stream S303.

As a result, the pressure and flow rate stream S302 enters the vaporization or boiler subsystem 356 of the system 300 are kept at values that are optimal for operating the system 300.

The optimal pressure of the stream S308 having the parameters at the point 8 is established by the control valve CV. The operation of the control valve CV is controlled by the DPU/APU based on measuring a condensation temperature of the condensed stream S301 corresponding to an initial coolant temperature of a cooling stream S350 having parameters as at a point 50. The condensation temperature is measured by a first temperature sensor $t_1$, a response of the first temperature sensor $t_1$ is then forwarded to the DPU/APU, which in turn uses the condensation temperature to control the control valve CV.

The optimal flow rate of the pressure adjusted feed pump output stream S308 is independently established by the operation of the bypass valve BV, the operation of which is controlled the DPU/APU based on measuring a final heat source temperature of a spent heat source stream S342 having parameters as at a point 42 exiting the vaporization subsystem 356. In actual fact, the system 300 needs to monitor a flow rate of the flow rate adjusted stream S302, but this flow rate is linearly related to the temperature of the spent heat source stream S342, after being cooled in heat exchange processes 2-10 or 41-42 and 10-16 or 40-41.

The control valve CV is thus operated and controlled by the processing unit subsystem DPU/APU based on the condensation temperature of the condensed stream S301 measured by the first temperature sensor $t_1$ as it exits the condenser HE1, which is used to set the pressure of the pressures adjusted stream S308 exiting the control valve CV. The bypass valve BV may be operated and controlled in the same manner by the processing subsystem DPU/APU based on the final temperature of the spent heat source stream S342 measured by the second temperature sensor $t_2$, which is used to set the flow rate of the pressure adjusted recirculation stream S304.

The pressure and flow rate adjusted stream S302 is then forwarded into the vaporization subsystem 356. The stream S302 first enters the second heat exchange unit HE2, where the stream S302 is heated in counterflow with a cooled heat source stream S341 having parameters as at a point 41 to form a heated or a partially vaporized stream S310 having parameters as at a point 10 and the spend heat source stream S342 having the parameters as at the point 42. The stream S310 is then forwarded into the third heat exchange system HE3, where the stream S310 is vaporized and/or superheated in counterflow with a heat source stream S340 having parameters as at a point 40 to form a vaporized or vaporized and superheated stream S316 having parameters as at a point 16 and the cooled heat source stream S341.

The vaporized or vaporized and superheated stream S316 is then forwarded to the heat conversion subsystem 358. The stream S316 then enters the turbine T forming a spent stream S318 having parameters as at a point 18 and a portion of the heat in the stream S316 is extracted and converted to a usable form of energy such as mechanical and/or electrical.

The spent stream S318 enters the condenser HE1, where the stream S318 is condensed in counterflow with a coolant stream S350 having parameters as at a point 50 to form the condensed stream S301 and a spent coolant stream S351 having parameters as at a point 51.

Second Specific Embodiment

Figure 3B:
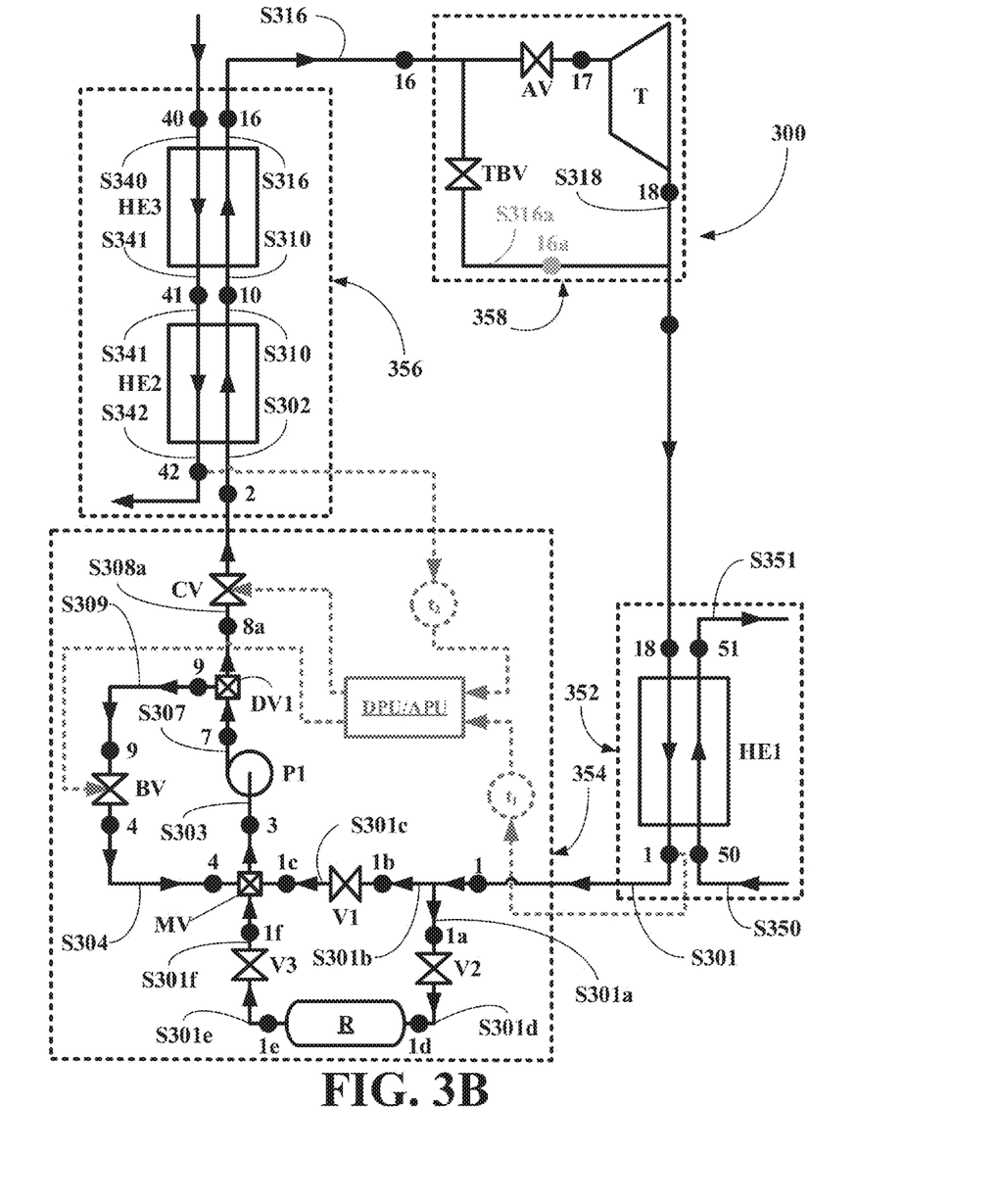
FIG. 3B depicts another embodiment of an optimized power generation system using geofluids.

Referring now to FIG. 3B, a variant of the improved ORC power system embodiment of the present system 300 comprises an alternate arrangement of the control valve CV, the bypass valve BV, the dividing valve DV and the mixing valve MV. The pressurized feed pump output stream S307 in this variant is divided by the dividing valve DV to form a flow rate adjusted stream S308a having parameters as at a point 8a and the recirculation stream S309. The flow rate adjusted stream S308a is then forwarded to the control valve CV adjusting its pressure to form the pressure and flow rate adjusted stream S302, while the recirculation stream S309 is feed to the bypass valve BV to form the pressure adjusted recirculation stream S304. In this variant, the operation of the bypass valve BV does not affect the operation of the control valve CV; this lack of feedback has advantages, in terms of stability, but also disadvantages, due to the lack of feedback. However, either variant is viable. In such a variant, the operation of the bypass valve BV affects the operation of the control valve CV; this feedback has some disadvantages, however either variant is viable.

As well as allowing for independent control of pressure and flow rate through the vaporization or boiling subsystem 356, the embodiments of this invention described above have the additional advantage that these system may fully regulate the flow rate of the stream through the turbine, without needing to use the admission valve AV installed prior to the turbine T to reduce the flow rate; the admission valve AV may then be left fully open, substantially reducing pressure losses. This then has the effect of reducing a pressure in the vaporization subsystem 356, which reduces a temperature of vaporization therein and increases the amount of heat from the heat source that can be used to vaporize the working fluid, thus increasing heat source utilization. All of these factors further increase the efficiency and output of the system.

Calculated Output of Nominal Megawatt ORC System

Calculations show that over the course of an average year of operations of an ORC geothermal power system, performance is improved as shown in Table 1 for the systems of this invention. In Table 1, ORC represents a conventional organic Rankine cycle system; CPFR ORC represents an organic Rankine cycle system modified to allow independent control of pressure and flow rate of the stream entering the vaporization subsystem; and WFCPFR ORC represents an organic Rankine cycle system modified to operate with a mixed propane-isopentane working fluid and independent control of pressure and flow rate of the stream entering the vaporization subsystem.

TABLE 1

Output for a Nominal 10 Megawatt ORC System Installation

| Cooling Air Temperature | ORC | CPFR ORC | % I[c] CPFR ORC | WFCPFR ORC | % I[c] WFCPFR ORC |
|---|---|---|---|---|---|
| 40° F | 10,582.7 kW | 10,823.3 kW | 2.27% | 11,445.9 kW | 8.16% |
| 50° F | 10,471.6 kW | 10,690.5 kW | 2.09% | 11,249.7 kW | 7.43% |
| 53° F[a] | 10,418.8 kW | 10,629.4 kW | 2.02% | 11,127.8 kW | 6.81% |
| 55° F[b] | 10,283.1 kW | 10,572.8 kW | 2.82% | 10,940.7 kW | 6.39% |
| 59° F | 10,000.1 kW | 10,350.6 kW | 3.51% | 10,584.4 kW | 5.84% |
| 70° F | 9,203.2 kW | 9,537.7 kW | 3.63% | 9,623.6 kW | 4.57% |
| 80° F | 8,433.7 kW | 8,639.6 kW | 2.44% | 8,774.8 kW | 4.04% |

[a]average annual temperature; [b]ISO conditions; [c]% I - percent improvement.

Embodiments for Decontamination Working Fluid in ORC Systems

In any ORC system, the turbines are lubricated by a lubricating oil, which ends up contaminating the organic working fluid. This contamination is a substantial problem in the operation of ORC system, which leads, over time, to a degradation of ORC system power output. Specifically, this degradation occurs because turbines in ORCs are lubricated with a lubricating oil, which inevitably comes into contact with the organic working fluid, e.g., hydrocarbon based or freon based. This contact allows some amount of the lubricating oil to mix with the working fluid, so that the working fluid vapor exiting the turbine contains some amount of the lubricating oil.

As this oil-bearing working fluid enters the condensation subsystem, it condenses completely and the oil carried therein dissolves in the working fluid. As a result, the condensate is actually a mixture of the working fluid and the lubricating oil. This condensate eventually enters into the vaporization or boiling subsystem. Crucially, in the process of boiling, the vapor produced contains almost none of the lubricating oil that was dissolved in the condensate during condensation. Thus, the concentration of the lubricating oil in the liquid in the boiler constantly increases as the ORC system continues operation.

If, in such a case, the pressure in the boiler is maintained at a constant level, then the temperature of the boiling point of the working fluid goes up. This causes a corresponding increase in a "pinch point" temperature of the heat source. Since a relative flow rate of the heat source remains constant, the total amount of heat available for vaporization is reduced. This, in turn, reduces the amount of vapor produced in the boiler and so less vapor is sent to the turbine.

If, on the other hand, the pressure in the boiler is adjusted (reduced) so that the temperature of the boiling point remains constant, then the pressure of the vapor sent to the turbine is reduced.

Either way, the power output of the turbine will be reduced and the degree of this reduction of power output may be substantial. This degradation of output caused by the lubricating oil contaminating the organic working fluid has been observed in all ORC systems using a lubricating oil to lubrication the turbine.

Observation of existing ORC systems show that over the course of several years, the reduction of power output may be as high as 30% to 40% of the nominal output of the systems.

In the prior art, the only method of dealing with this issue is to fully remove the contaminated working fluid, and either discarding the oil-contaminated working fluid and replacing it with clean working fluid or else cleaning via vaporization the contaminated working fluid in some other apparatus, collecting the clean vapor, condensing the clean vapor, and then returning the cleaned working fluid to the power system. In the prior art, both of these options are complicated and costly to implement, but both will mitigate the issue of oil contamination of the working fluid for a time (on order of 1 year) before new contamination makes the issue return again. Either way, using the techniques available in the prior art, such repeated replacement or "cleaning" of the working fluid are not very practical.

The present method for decontaminating lubricating oil contaminated working fluid utilizing existing apparatus of the system of FIG. 3A or FIG. 3B in a novel manner. Periodically, the system is taken off-line for a period of time. During this period, the turbine T and the feed pump P1 are stopped. In addition, the control valve CV and the turbine admission valve AV are fully closed, while the turbine bypass valve TBV is fully opened. At the same time, the valve V1 is closed and the valve V2 is opened. It should be recognized that the bypass valve TBV, is already part of conventional ORC systems. In certain embodiments, the period is less than 1 day. In other embodiments, the period is between about 4 and about 24 hours. In other embodiments, the period is between about 6 and about 24 hours.

Meanwhile, the heat source stream S340 is still sent through the vaporization subsystem 356, allowing the working fluid already in the vaporization subsystem 356 to vaporize, bypassing the turbine T and passing through the turbine bypass valve TBV to form a bypass vapor stream S316a having parameters as at a point 16a, which is then forwarded to the condensation subsystem 352, where it is condensed. This condensed stream is oil-free or substantially oil-free, as the vapor leaving the vaporization subsystem leaving almost all of the oil contamination behind in the boiler and no new contamination is picked up from the turbine T, which is being bypassed. This cleaned working fluid is then sent from the condenser HE1 to be collected in the reserve tank R. The reserve tank R is already a part of conventional ORC systems.

As the amount of working fluid in the vaporization subsystem is reduced, the concentration of contaminating oil in the remaining working fluid in the vaporization subsystem goes up. Thus, as explained above, the temperature in the boiler goes up. When this temperature reaches a desired level, which may be determined by one experienced in the art, the entire process is stopped. At this point, only a small amount (5% to 10% of the working fluid) of heavily contaminated working fluid is left in the vaporization subsystem. This heavily contaminated working fluid is then safely removed from the system for disposal removing all or substantially all of the oil contamination from the system. New uncontaminated working fluid is then added from inventory to the reserve tank R to make up the loss of working fluid removed. Once this is done, the control valve CV and the admission valve AV are opened as set forth in the embodiments of FIG. 3A and FIG. 3B. The valve V3 is then fully opened and the working fluid in the reserve tank R reenters into the system. Once the working fluid reenters the system, the valve V2 is closed and the valve V1 is opened and the system is put back in normal operation, with a substantially clean working fluid, i.e., a working fluid free or substantially free of the lubricating fluid. Oil contamination will immediately begin to build up again, but since this cleaning process may be done in less than a single day, and is relatively low cost and simple to execute. The procedure may be repeated on a periodic basis such as a yearly basis, thus keeping oil contamination of the working fluid under control and preventing the very substantial loss of power output that high degrees of oil-contamination cause in an ORC system.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A system for implementing a thermodynamic cycle comprising:
    a condenser subsystem comprising at least one first heat exchange unit that condenses a spent working fluid stream to form a condensed working fluid stream,
    a working fluid pressure and flow control subsystem comprising at least a feed pump, a control valve, a bypass valve, a first temperature sensor, a second temperature sensor, a dividing valve, and a mixing valve, where a processing unit adjusts a flow rate and a pressure of a vaporization subsystem input stream from the condensed working fluid stream,
    a vaporization or boiling subsystem comprising at least one heat exchange unit that vaporizes the flow rate and pressure adjusted vaporization subsystem input stream to form a vaporized energy conversion subsystem input stream, and
    an energy conversion subsystem comprising at least one turbine that extracts a portion of thermal energy from the vaporized energy conversion subsystem input stream to form the spent working fluid stream,
    where the mixing valve combines the condensed working fluid stream and a pressure adjusted recirculation stream exiting the bypass valve to form a feed pump input stream,
    where the feed pump pumps the feed pump input stream to a higher pressure to form a pressurized stream,
    where the bypass valve adjusts a pressure and a flow rate of the recirculation stream to form the pressure adjusted recirculation stream,
    where the working fluid comprises a base component and an effective amount of a lower boiling point component, where the effective amount is sufficient to increase a power utilization efficiency of the system, without substantially changing a weight of the fluid, reducing turbine efficiency for the particular base component, and
    where the control valve and the bypass valve are flow control valves and are controlled by the processing unit controlled in such a way as to optimize the pressure and flow rate of the flow rate and pressure adjusted vaporization subsystem input stream optimizing a power output of the system based on a condensation temperature of the condensed working fluid stream and a final heat source temperature increasing system output between about 3% and 6% on a yearly basis.

2. The system of claim 1, wherein:
    the dividing valve divides the pressurized stream into a control valve input stream and a recirculation stream, and
    the control valve adjusts a pressure and a flow rate of the control valve output stream to form the flow rate and pressure adjusted vaporization subsystem input stream.

3. The system of claim 1, wherein:
    the control valve adjusts a pressure and a flow rate of the pressurized control valve input stream to form a pressure adjusted stream, and
    the dividing valve divides the pressurized adjusted stream into the flow rate and pressure adjusted vaporization subsystem input stream and a recirculation stream.

4. The system of claim 1, wherein:
    the base component comprises a hydrocarbon or a freon, and
    the lower boiling point component comprises a hydrocarbon or a freon, having a boiling point lower than the boiling point of the base component.

5. The system of claim 4, wherein the base component is isopentane and the lower boiling point component comprises propane.

6. A method for implementing a thermodynamic cycle comprising the steps of:
    condensing a spent working fluid stream in counterflow with a coolant stream in a condenser subsystem comprising at least one first heat exchange unit to form a condensed working fluid stream, producing a vaporization subsystem input stream in a working fluid pressure and flow control subsystem comprising at least a feed pump, a control valve, a bypass valve, a first temperature sensor, a second temperature sensor, a dividing valve, a mixing valve and a processing unit from the condensed working fluid stream, combining the condensed working fluid stream and a pressure adjusted recirculation stream exiting the bypass valve in the mixing valve to form a feed pump input stream, pumping the feed pump input stream to a higher pressure in the feed pump to form a pressurized stream, adjusting a pressure and a flow rate of the recirculation stream in the bypass valve to form the pressure adjusted recirculation stream, vaporizing the vaporization subsystem input stream in a vaporization or boiling subsystem comprising at least one heat exchange unit to form a vaporized energy conversion subsystem input stream, and converting a portion of the thermal energy in the vaporized energy conversion subsystem input stream in an energy conversion subsystem comprising at least one turbine to form the spent working fluid stream, where the working fluid includes a base component and an effective amount of a lower boiling point component, where the effective amount is sufficient to raise a power utilization efficiency of the systems by up to 10%, without substantially changing a weight of the fluid, reducing turbine efficiency for the particular base component, and where the control valve and the bypass valve are flow control valves and are controlled by the processing unit controlled in such a way as to optimize the pressure and flow rate of the flow rate and pressure adjusted vaporization subsystem input stream optimizing a power output of the system based on an initial coolant temperature and a final heat source temperature and where the system increases system output between about 3% and 6% on a yearly basis.

7. The method of claim 6, further comprising the steps of:

dividing the pressurized stream into a control valve input stream and a recirculation stream in the dividing valve, and adjusting a pressure and a flow rate of the control valve input stream in the control valve to form the vaporization subsystem input stream.

8. The method of claim 6, further comprising the steps of:

adjusting a pressure and a flow rate of the pressurized control valve input stream in the control valve to form a pressure adjusted stream, and dividing the pressure adjusted stream in the dividing valve into the vaporization subsystem input stream and a recirculation stream.

9. The method of claim 6, wherein:

the base component comprises a hydrocarbon or a freon, and the lower boiling point component comprises a hydrocarbon or a freon, having a boiling point lower than the boiling point of the base component.

10. The method of claim 9, wherein the base component is isopentane and the lower boiling point component is propane.

11. The system of claim 4, wherein the base component and the lower boiling point component comprises propane, n-butane, n-pentane, n-hexane, n-heptane, n-octane, isobutane, isopentane, isoheptane, isooctane, or higher n-alkanes or higher n-isoalkanes, where the base component has a higher boiling point than the lower boiling point component.

12. The system of claim 9, wherein the base component and the lower boiling point component comprises propane, n-butane, n-pentane, n-hexane, n-heptane, n-octane, isobutane, isopentane, isoheptane, isooctane, or higher n-alkanes or higher n-isoalkanes, where the base component has a higher boiling point than the lower boiling point component.

\* \* \* \* \*